(12) United States Patent
Aliyar

(10) Patent No.: US 10,028,309 B2
(45) Date of Patent: Jul. 17, 2018

(54) CLOUD PHONE NOTIFICATIONS

(71) Applicant: Apple Inc., Cupertino, CA (US)

(72) Inventor: Jaseem Aliyar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 15/026,954

(22) PCT Filed: Oct. 2, 2013

(86) PCT No.: PCT/US2013/063138
§ 371 (c)(1),
(2) Date: Apr. 1, 2016

(87) PCT Pub. No.: WO2015/050544
PCT Pub. Date: Apr. 9, 2015

(65) Prior Publication Data
US 2016/0316500 A1    Oct. 27, 2016

(51) Int. Cl.
*H04W 4/00* (2009.01)
*H04W 76/02* (2009.01)
(Continued)

(52) U.S. Cl.
CPC ......... *H04W 76/023* (2013.01); *H04W 4/008* (2013.01); *H04W 8/26* (2013.01);
(Continued)

(58) Field of Classification Search
CPC ... H04W 76/023; H04W 76/048; H04W 8/26; H04W 4/008; H04W 48/18; H04W 4/003; H04W 84/12; H04W 84/20
See application file for complete search history.

(56) References Cited

U.S. PATENT DOCUMENTS 5,483,261 A    1/1996 Yasutake
5,488,204 A    1/1996 Mead et al.
(Continued)

FOREIGN PATENT DOCUMENTS

JP    2000-163031 A    6/2000
JP    2002-342033 A    11/2002

OTHER PUBLICATIONS

Final Office Action dated May 5, 2016, for U.S. Appl. No. 14/341,562, filed Jul. 25, 2014, 17 pages.
(Continued)

*Primary Examiner* — Afshawn M Towfighi
(74) *Attorney, Agent, or Firm* — McDermott Will & Emery LLP

(57) ABSTRACT

This relates to a method of sending data, such as documents, notifications, alerts, and messages, from a first wireless device to a second wireless device through a wireless connection, such as WiFi, when the limitations of Bluetooth capabilities are exceeded. The method of sending data can include, for example, the first wireless device storing the data on a remote server in a cloud computing system, and the second wireless device accessing the stored data from the remote server. The wireless devices can be configured to detect when another wireless device is out of physical range, when there are too many devices sharing the connection, if the environmental conditions are unsuitable, or if a device has powered down, for example. Additionally, the user or application may require a higher data transfer rate or a more secure connection.

20 Claims, 9 Drawing Sheets

(51) Int. Cl.
  *H04W 48/18*   (2009.01)
  *H04W 8/26*    (2009.01)
  *H04W 76/04*   (2009.01)
  *H04W 84/12*   (2009.01)
  *H04W 84/20*   (2009.01)

(52) U.S. Cl.
  CPC ......... *H04W 48/18* (2013.01); *H04W 76/048* (2013.01); *H04W 4/003* (2013.01); *H04W 84/12* (2013.01); *H04W 84/20* (2013.01)

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 5,881,055 A | 3/1999 | Kondo |
| 6,023,722 A | 2/2000 | Colyer |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,130,664 B1 | 10/2006 | Williams |
| 7,174,161 B2 | 2/2007 | Nakajima et al. |
| 7,184,064 B2 | 2/2007 | Zimmerman et al. |
| 7,663,607 B2 | 2/2010 | Hotelling et al. |
| 7,715,855 B2 | 5/2010 | Subrahmanya |
| 7,949,377 B2 | 5/2011 | Islam et al. |
| 8,102,790 B1 | 1/2012 | Trehus |
| 8,479,122 B2 | 7/2013 | Hotelling et al. |
| 8,547,941 B2 | 10/2013 | He et al. |
| 9,037,485 B2 | 5/2015 | Fu et al. |
| 2002/0039194 A1* | 4/2002 | Nakao ................. H04N 1/00127 358/1.14 |
| 2006/0197753 A1 | 9/2006 | Hotelling |
| 2007/0264948 A1 | 11/2007 | Jansson et al. |
| 2009/0305732 A1 | 12/2009 | Marcellino et al. |
| 2010/0159948 A1* | 6/2010 | Spivey ................. H04L 12/10 455/456.1 |
| 2010/0291909 A1* | 11/2010 | Nagaraja ............... H04M 1/575 455/415 |
| 2010/0297992 A1* | 11/2010 | Oyabu ................. H04W 68/00 455/422.1 |
| 2012/0182143 A1 | 7/2012 | Gaines et al. |
| 2013/0084914 A1 | 4/2013 | Wu et al. |
| 2013/0190032 A1 | 7/2013 | Li |
| 2013/0227083 A1* | 8/2013 | Kim .................. G06F 17/30203 709/219 |
| 2013/0324052 A1* | 12/2013 | Toshimitsu ............. H04W 8/22 455/68 |
| 2014/0280747 A1* | 9/2014 | Johns .................. H04L 67/1097 709/219 |
| 2015/0286391 A1 | 10/2015 | Jacobs et al. |
| 2016/0029311 A1 | 1/2016 | Wolkowicki et al. |

OTHER PUBLICATIONS

International Search Report dated Jul. 4, 2014, for International Application No. PCT/US2013/063138, filed Oct. 2, 2013, three pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Nov. 20, 2015, for U.S. Appl. No. 14/341,562, filed Jul. 25, 2014, 24 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

CLOUD PHONE NOTIFICATIONS

CROSS-REFERENCE TO RELATED APPLICATIONS

This application is a National Phase application under 35 U.S.C. § 371 of International Application No. PCT/US2013/063138, filed Oct. 2, 2013, the content of which is hereby incorporated by reference in its entirety for all intended purposes.

FIELD OF THE DISCLOSURE

This relates generally to wireless communication between computing devices, and more particularly to connectivity between computing devices when low-power, low-bandwidth, short-range communications are unavailable.

BACKGROUND OF THE DISCLOSURE

Computing devices such as desktop computers, laptop computers, mobile phones, smartphones, wearable devices, tablet devices and portable multimedia players are popular. These computing devices can be used for performing a wide variety of tasks, from the simple to the most complex.

In some instances, computing devices can communicate wirelessly over wireless networks. For example, computing devices can communicate over wireless networks based on the Institute of Electrical and Electronics Engineers (IEEE) 802.11 family of standards, also referred to as "WiFi". The standards (including 802.11a, 802.11b, and 802.11g) define frequency, modulation, data rates, and message formats for communicating information between devices. In general, in an 802.11 compliant wireless network (also referred to as a "WiFi network"), there is a designated "access point," often with a wired connection to the Internet, that manages the WiFi network. Among other operations, the access point can route messages between networked client devices. Computing devices can communicate wirelessly over other communication standards as well. For example, computing devices can use the IEEE 802.15 standards, such as Bluetooth, Bluetooth Low Energy (LE), ZigBee, etc. Bluetooth can allow for computing devices to communicate wirelessly through the use of low-power, short-range radios. As a result, Bluetooth can be limited to communications between devices that are physically located within a short distance from each other. Furthermore, the number of devices that can be paired with a Bluetooth connection can be limited, and communications between the devices can be slow.

Certain activities performed by a user carrying a wireless device can exceed the limitations of Bluetooth capabilities when connected to another wireless device. For example, the user can relocate to a distance far away from the other wireless device, the user can step outside, or the wireless device can lose power. Pairing a wireless device carried by the user, such as a wearable device, to another wireless device, such as a cellular phone, through Bluetooth under the circumstances described above can make the wireless connectivity impractical or unachievable and thus can limit the usability of the communication between multiple wireless devices.

SUMMARY

This relates to a first wireless device that can communicate and send data to a second wireless device when the wireless connection between the two exceeds the limitations of Bluetooth capabilities. The first wireless device can be configured to detect when the second wireless device is out of physical range, when there are too many devices sharing the connection, if the environmental conditions are unsuitable, or if a device has powered down, for example. Additionally, the user or application may require a higher data transfer rate or a more secure connection. The wireless devices can be configured to communicate to each other through an alternate wireless connection, such as WiFi. A first wireless device can be connected to a second wireless device through the WiFi connection, and the first wireless device can send data, such as documents, notifications, alerts, and messages, to the second wireless device using the WiFi connection. A cloud computing system can be utilized by the first wireless device to store the data, and the second wireless device can download or receive the data by accessing a remote server on the cloud computing system.

DETAILED DESCRIPTION

In the following description of examples, reference is made to the accompanying drawings which form a part hereof, and in which it is shown by way of illustration specific examples of the disclosure that can be practiced. It is to be understood that other examples can be used and structural changes can be made without departing from the scope of the examples of this disclosure.

This relates to a method of sending data, such as documents, notifications, alerts, and messages, from a first wireless device to a second wireless device through a wireless connection, such as WiFi, when the limitations of Bluetooth capabilities are exceeded. The method of sending data can include, for example, the first wireless device storing the data on a remote server in a cloud computing system, and the second wireless device accessing the stored data from the remote server.

Although examples disclosed herein may be described and illustrated herein in terms of the IEEE 802.11 and IEEE 802.15 standard communications protocols, it should be understood that the examples are not so limited, but are additionally applicable to other wireless communications protocols in which communication can be established between devices. Furthermore, although examples may be described and illustrated herein in terms of wireless routers acting as wireless access points, it should be understood that the examples are also applicable to servers and other computing devices, which can act as wireless access points. Additionally, although examples may be described herein in terms of a cloud computing environment, it should be understood that the examples are also applicable to other networks or computing environments that may be accessible via wired or wireless means.

Figure 1:
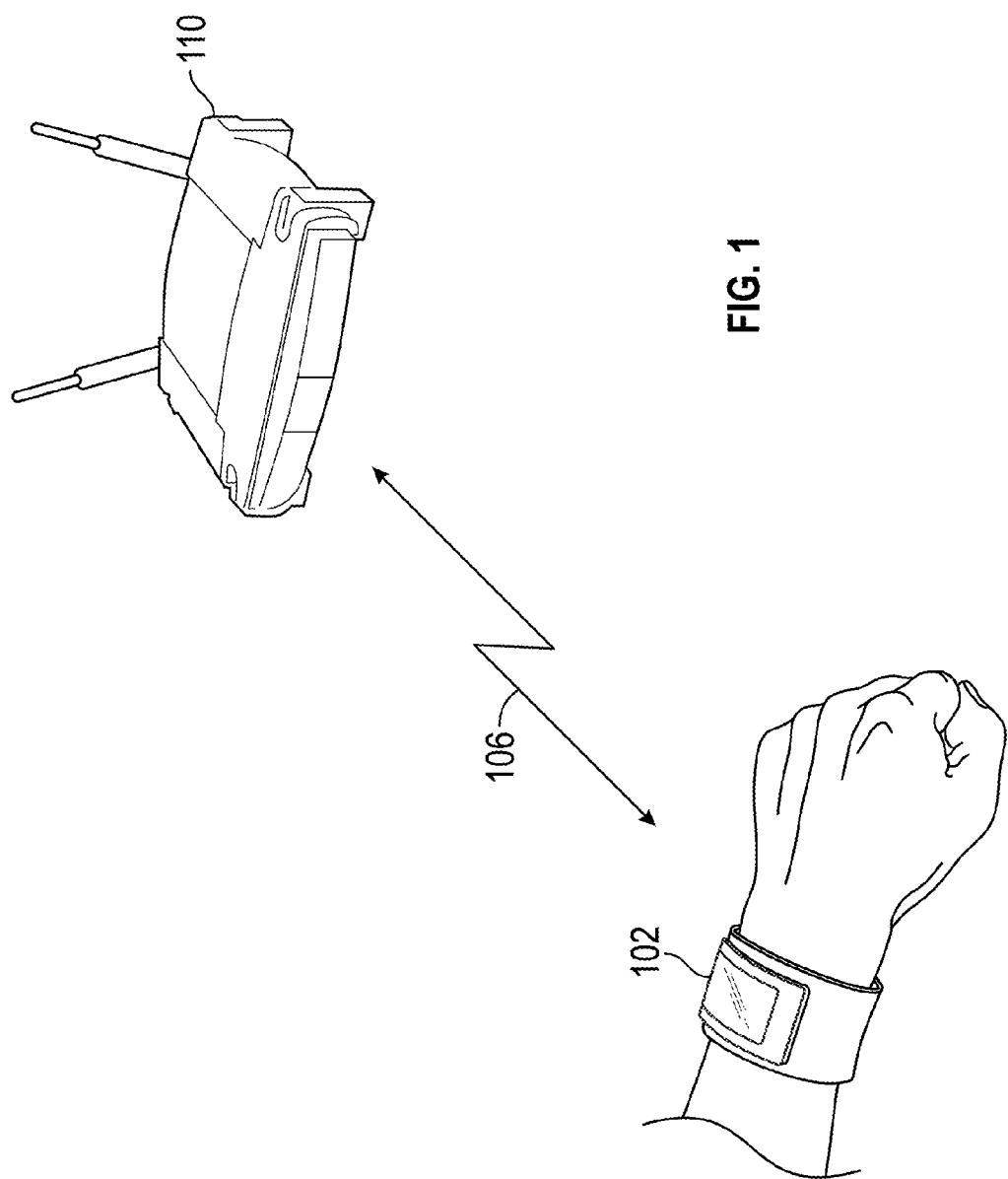
FIG. 1 illustrates a communications link between a wireless device and a paired device over a local wireless network.

FIG. 1 illustrates a communications link between a wireless device and a paired device over a local wireless network. The wireless device 102 can be linked to paired device 110 via wireless communications link 106. The wireless device and paired device can be any portable or non-portable electronic device that has the ability to connect to a computer network wirelessly. As long as the wireless device and the paired device are properly paired together, wireless communications link 106 can be established between the two. Pairing can refer to the wireless device and the paired device establishing a direct communications link with one another. Once a link has been established between the wireless device and the paired device, thus making the devices paired together, the wireless device and the paired device can share information with each other. Wireless communications link 106 is a local wireless network, often referred to as a piconet, which is a short range local wireless network. One example of a local wireless network is a Bluetooth network that can be established using Bluetooth or IEEE 802.15 protocol. In some examples, the wireless device and the paired device can establish a communications link using Bluetooth LE. Bluetooth and Bluetooth LE are used only as examples and the disclosure is not limited in this regard, and can also include other known communication methods such as near field communication protocols (NFC).

Bluetooth allows wireless devices to connect with each other through low-power, low-bandwidth, short-range communications. Bluetooth's low power transmissions allow a typical range of about 10 meters or roughly 30-40 feet. This range can vary depending on the amount of power used by the devices and the environmental conditions. Additionally, Bluetooth devices can be limited by the maximum throughput capabilities of Bluetooth. The maximum throughput can be shared amongst the devices on the connection. Sharing of the maximum throughput can lead to slow communication between the devices and also limitations to the number of devices that can be connected. When the physical separation between wireless devices are outside the range of Bluetooth, the number of connected devices has been exceeded, the environmental conditions are unsuitable, or one of the wireless devices powers down, the wireless communications link 106 can be lost or dropped, and information can no longer be shared between wireless device 102 and paired device 110. Additionally, for certain applications, the user or device processor may desire higher transfer rates or a more secure connection than can be achieved with Bluetooth. The wireless connectivity and communications between one or more wireless devices and paired devices can become impractical or unachievable in such situations.

To facilitate the pairing of wireless device 102 with paired device 110, wireless device 102 and paired device 110 can be brought in close proximity to one another, which can include direct physical contact. The close proximity of the devices can secure the pairing process from unauthorized intruders and allow for communication between the devices through the link. The pairing process may or may not require a pin code. Both wireless device 102 and paired device 110 can include a Bluetooth unit (not shown). Wireless device 102 and paired device 110 can periodically monitor the connection through the wireless communications link 106 using the Bluetooth units. If a connection is not detected or has been dropped, at least one of the Bluetooth units can attempt to reestablish a connection. If the initial attempt to pair the wireless device 102 and paired device 110 fails or the dropped connection cannot be reestablished, the wireless device 102, paired device 110, or both can generate an event notifying the other wireless device or the user. The connection can be established using a different wireless communication means, such as WiFi. In some examples, one or more attempts to establish a connection over Bluetooth can be made. In some examples, the wireless device or paired device can skip the initial pairing through Bluetooth and instead connect using WiFi.

Figure 2:
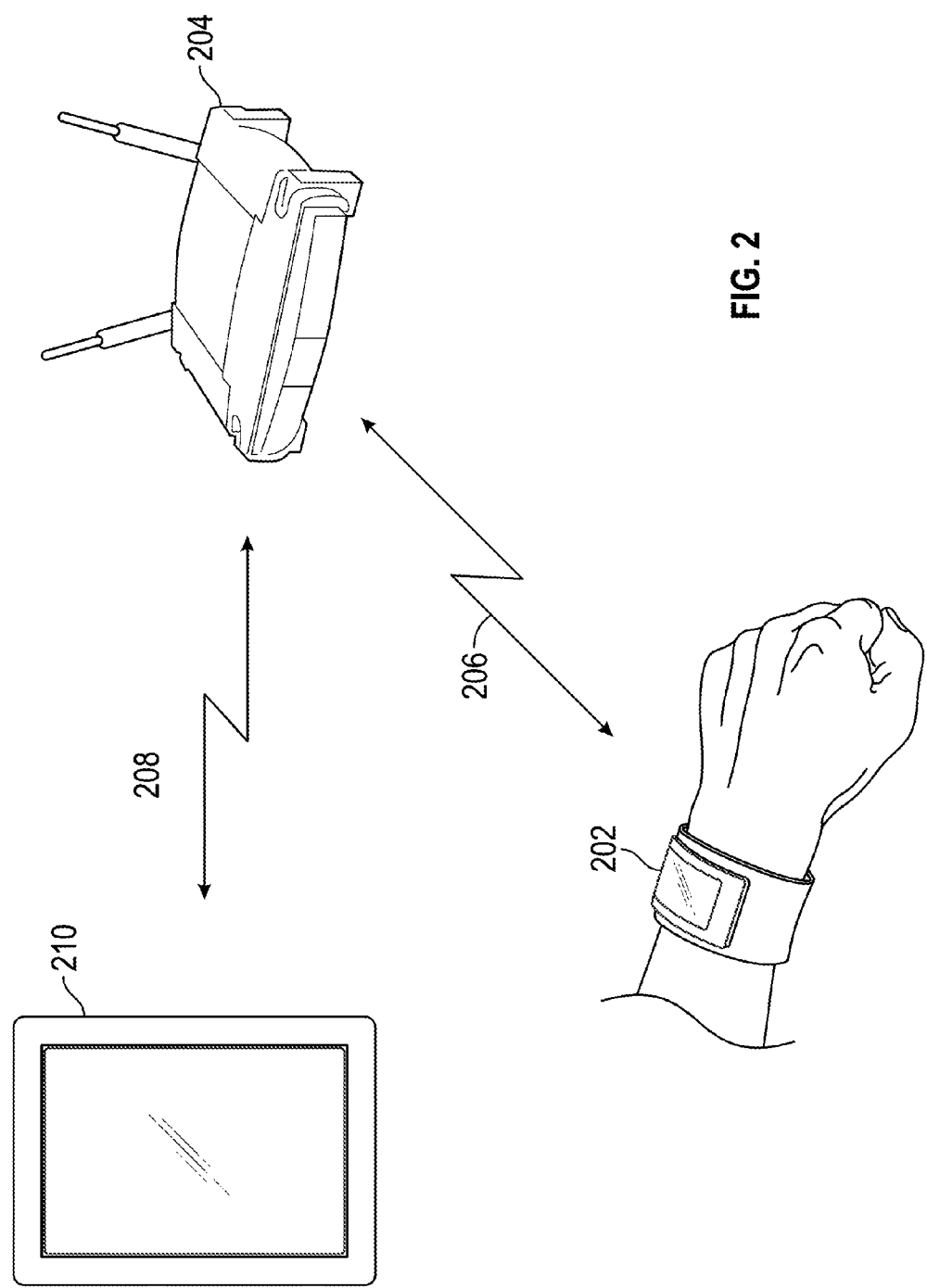
FIG. 2 illustrates an exemplary wireless device connected to another wireless device over a WiFi network according to examples of the disclosure.

FIG. 2 illustrates an exemplary wireless device connected to another wireless device over a WiFi network according to examples of the disclosure. When the limitations of a Bluetooth connection between multiple wireless devices are exceeded or when an alternate connection is desired, a connection using a different communication means, such as WiFi, can be established. A first wireless device 202 can be linked to wireless access point 204 via wireless communications link 206. Wireless access point 204 could be, for instance, a wireless router that allows wireless devices, such as the one depicted as 202, to establish connections to it. Wireless access point 204 can be hard wired to the Internet using a standard Ethernet cable (not shown), and can provide Internet connectivity to devices connected to it. Similarly, a second wireless device 210 can be linked to wireless access point 204 via communications link 208 (which may be a wired or wireless connection). Communications links 206 and 208 can be established using the IEEE 802.11 protocol.

Communications link 206 can be established as follows. Wireless access point 204 can broadcast its presence periodically to alert proximate device that it is available for connection. In one example, wireless access point 204 can broadcast a service set identifier (SSID) at periodic intervals to alert devices that are in proximity to its presence. When the first wireless device 202 receives a notification of a dropped Bluetooth connection or when an application desires to use a WiFi connection, the first wireless device 202 can begin to "scan" for SSIDs being broadcast by wireless access points that are nearby. In some examples, the first wireless device 202 can detect a dropped Bluetooth connection and can generate the notification. In some examples, the second wireless device 210 can predict if the Bluetooth connection is going to be dropped in the near future, and the notification can be generated at the second wireless device 210 and transmitted to the first wireless device 202 before the Bluetooth connection is dropped. In some examples, detection of a dropped Bluetooth connection or prediction of a soon to be dropped Bluetooth connection can include determining the signal strength and determining whether the signal strength falls below a predetermined level. Once the scan for SSIDs is complete, the first wireless device 202 can present a list of found SSIDs, the user can pick a wireless access point to connect with, and communications link 206 can be established per IEEE 802.11. Similarly, communications link 208 can be established when the second wireless device 210 receives or generates a notification of a dropped Bluetooth connection and scans for SSIDs being broadcast by wireless access points. In some examples, wireless devices 202 and 210 can include a timer to time how long the wireless devices have been trying to acquire a known SSID from a known wireless access point. If a known SSID has not been found within a predetermined time limit, the wireless device can stop searching and generate a timeout notification. In some examples, the wireless device can begin searching again for a known SSID after a certain amount of time has elapsed since the last search. In some examples, the wireless devices can begin searching again for a known SSID when requested by the user.

Once the user selects a particular SSID, the SSID can be stored on the device such as on a list for future reference. In the future, the device can periodically scan for SSIDs without being prompted by the user. If the device encounters an SSID of a wireless access point that is on the list, it can automatically connect to the wireless access point. The list can be populated with one or more SSIDs that have been used for past connections, such as a home network, a work network, a school network, etc.

When the first wireless device 202 wants to communicate with the second wireless device 210 over the WiFi connection, the first wireless device 202 can do so by sending an address resolution (ARP) request to wireless access point 204 via communications link 206 that includes the IP address of the second wireless device 210. The wireless access point 204 can broadcast the ARP request that contains the IP address of the second wireless device 210 over the network. The second wireless device 210, when scanning, can receive the ARP request, recognize that the ARP request corresponds to its own IP address, and establish a communications link 208 with the wireless access point 204 to field the ARP request.

Once the connection between the wireless devices 202 and 210 has been established via communications link 206 and 208 through the wireless access point 204 using the ARP request, data can be transferred using "beacons". Beacons can be transmitted by the wireless access point at periodical intervals to devices that are on the network. Beacons can provide information to devices on the network regarding data that is being received by the wireless access point. When a wireless device is synchronized to a wireless access point, it can know at what time the wireless access point will transmit a beacon. When the wireless device knows that the wireless access point will be transmitting a beacon, the wireless device can activate its wireless radio to receive the beacon. The beacon can contain information that the wireless device needs to receive Internet traffic. For instance, in WiFi networks, each device associated with the network carries an association ID (AID) that the wireless access point uses to identify devices on the network. As part of its transmission of a beacon, a wireless access point can transmit what is known as a traffic indication map (TIM). When the wireless access point receives data (for example, from the Internet or from another device on the local network) that is intended for a particular associated device on the network, it can list in the TIM the AIDs of the devices that have pending data on the network. As part of broadcasting beacons, the wireless access point can broadcast its TIM. When a wireless device receives a beacon, it can look to the TIM to see if there is pending traffic intended for it, and if it finds that there is traffic on the network for it, it can proceed to download the information from the wireless access point.

Figure 3A:
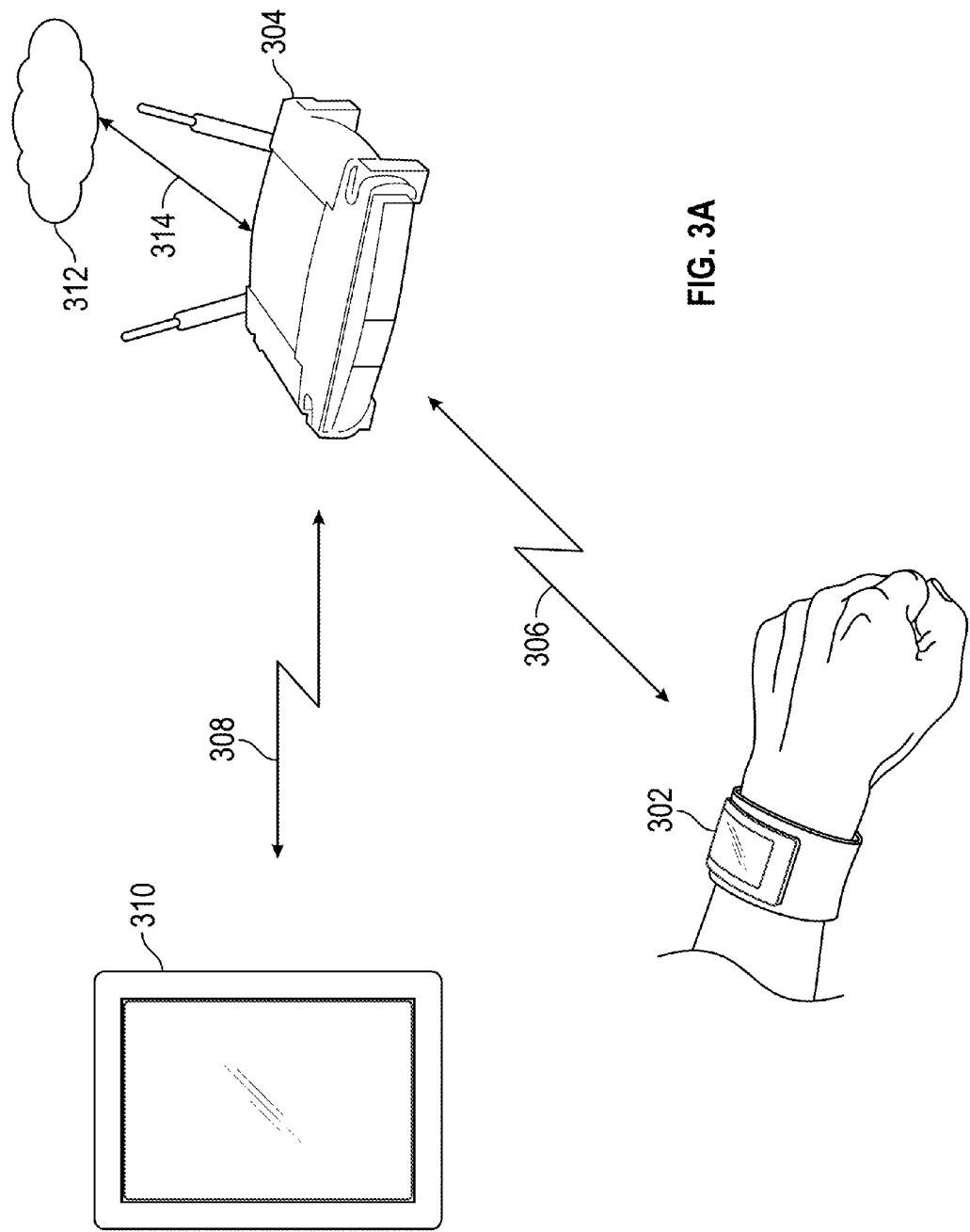
FIG. 3A illustrates an exemplary wireless device connected with another wireless device over a WiFi network in a cloud computing environment according to examples of the disclosure.

FIG. 3A illustrates an exemplary wireless device connected with another wireless device over a WiFi network in a cloud computing environment according to examples of the disclosure. A first wireless device 302 can connect to wireless access point 304 through communications link 306, and a second wireless device can connect to wireless access point 304 through communications link 308 (which may be a wireless or wired connection). Communications link 306 and 308 can be established using the process discussed above. Wireless access point 304 can connect to a remote server 312 via communications link 314. The cloud computing environment can enable a user to generate a document, a file, a notification, or information on one computing device, such as the second wireless device 310, and allow the document, file, notification, or information to be accessed, edited, and downloaded from one or more other computing devices, such as the first wireless device 302. While FIG. 3A illustrates two wireless devices, any number of wireless devices can be configured, and authorized, to share content on the remote server. In some examples, more than one remote server can be included in the cloud computing environment to support the storage and synchronization of the content to the multiple computing devices.

In a cloud computing environment, data such as documents, files, notifications, or information can be stored on a remote server and can be accessed, downloaded, or edited at any given time from different computing devices. To enable the user to access, download, and edit the data via any one of the computing devices, the file can be stored both locally on the devices and also on a remote server. Storing the file both locally and on the remote server can allow the user to access the same version of the data from any of the computing devices. The remote server can then synchronize the local copies of the data on the multiple computing devices. For example, the user can create a document on a computing device, such as the second wireless device 310, and store the document on a remote server 312 via communications link 308, wireless access point 304, and communications link 314. The user can access the same document that was stored on the remote server 312 by using a different computing device, such as the first wireless device 302, via communications link 314, wireless access point 304, and communications link 306. When the user edits the document, a local copy that resides in memory on the second wireless device 310 can be edited. The local copy can be synced with copy stored on the remote server such that edits made by second wireless device 310 can be accessed by first wireless device 302.

Figure 3B:
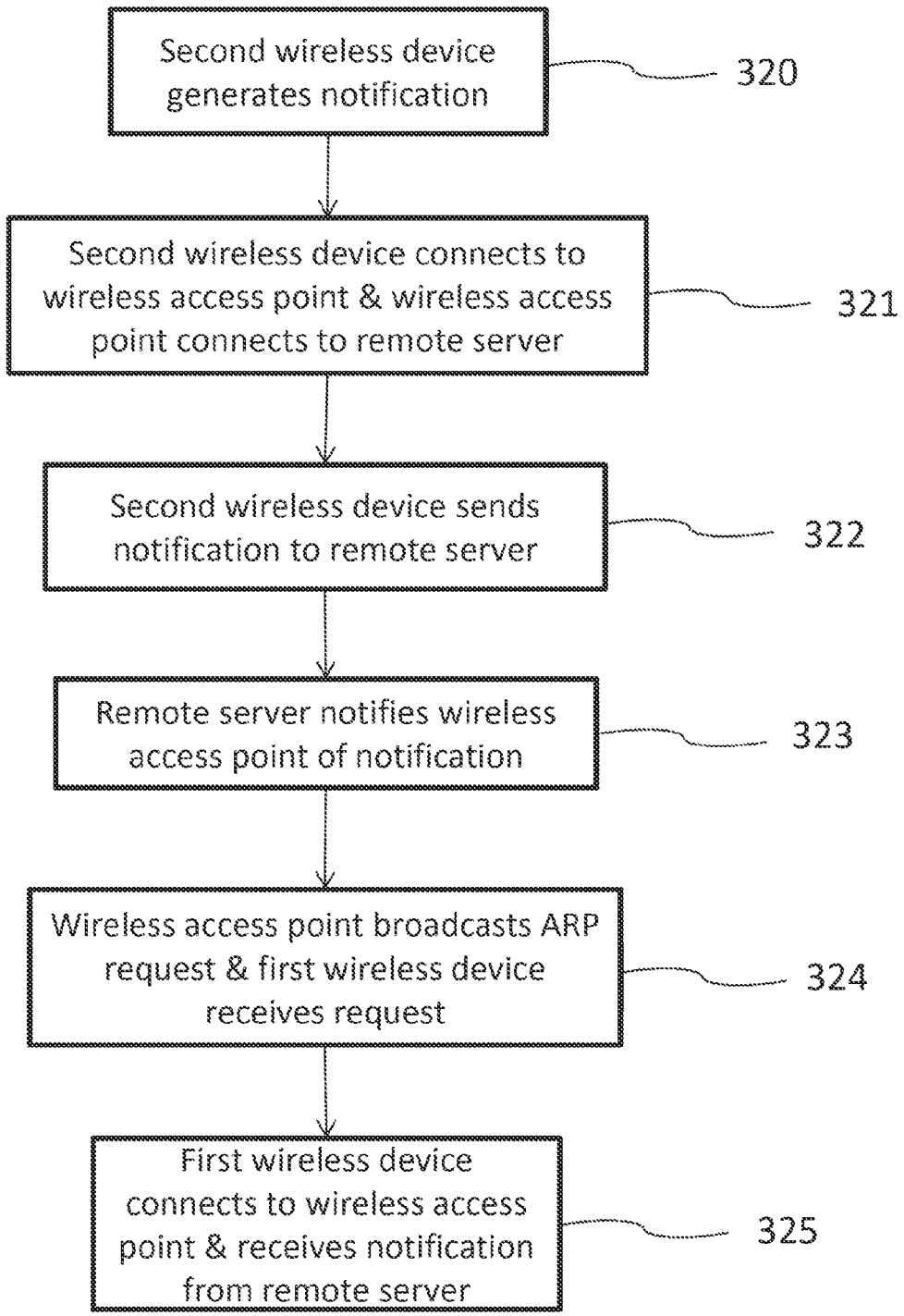
FIG. 3B illustrates a flow chart of an exemplary process flow for sending messages between wireless devices according to various examples of the disclosure.

FIG. 3B illustrates a flow chart of an exemplary process flow for sending messages between wireless devices according to various examples of the disclosure. The remote server and wireless access point can be used to send notifications and messages between one or more wireless devices. Beginning at 320, second wireless device 310 can generate a notification or a message that is directed to the first wireless device 302. At 321, the second wireless device 310 can connect to wireless access point 304 via communications link 308. Wireless access point 304 can connect to remote server 312 via communications link 314. At 322, the second wireless device 310 can send the notification through communications link 308, wireless access point 304, and communications link 314 to the remove server 312. At 323, the remote server can notify the wireless access point of a notification to be sent to the first wireless device 302. In some examples, the remote server can delay pushing the notification based on a time period or based on the availability of the first wireless device 302. At 324, the wireless access point can push the notification to the first wireless device 302 by broadcasting an ARP request that contains the IP address of the first wireless device 302. Along with the ARP request, the wireless access point can transmit beacons and its TIM containing information that the first wireless device 302 needs to receive Internet traffic. The first wireless device 302 can periodically scan for ARP requests. The first wireless device 302, when scanning, can receive the ARP request and recognize that the ARP request corresponds to its own IP address. At 325, the first wireless device 302 can establish communications link 306 with the wireless access point 304 to field the ARP request. When the first wireless device 302 receives a beacon, it can look to the TIM to see if there is pending traffic intended for it. The first wireless device 302 can find that there is traffic on the network for it, and it can proceed to receive the pushed notification from the wireless access point 304.

Figure 4A:
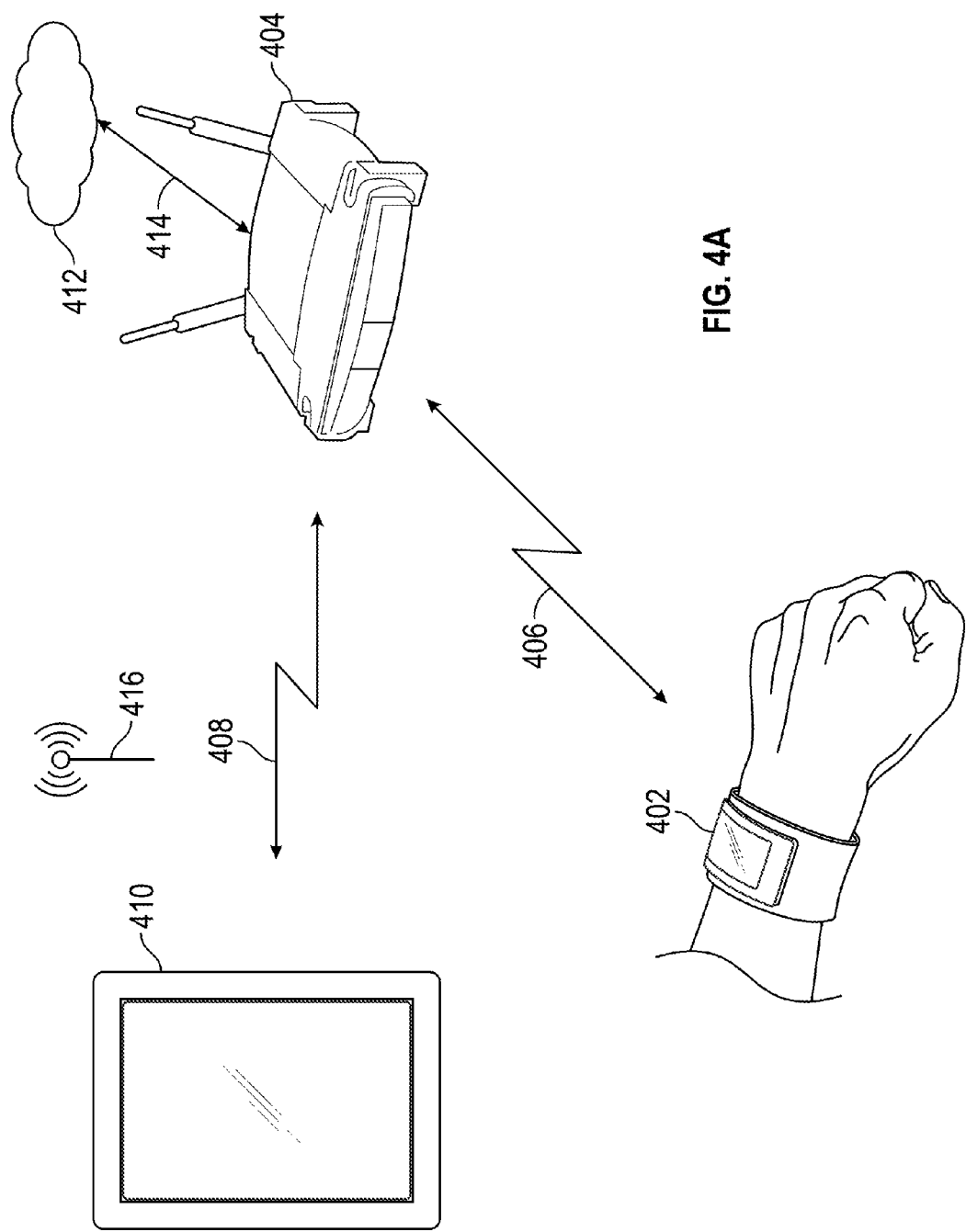
FIG. 4A illustrates an exemplary cellular device connected with a wireless device over a WiFi network in a cloud computing environment according to examples of the disclosure.
Figure 4B:
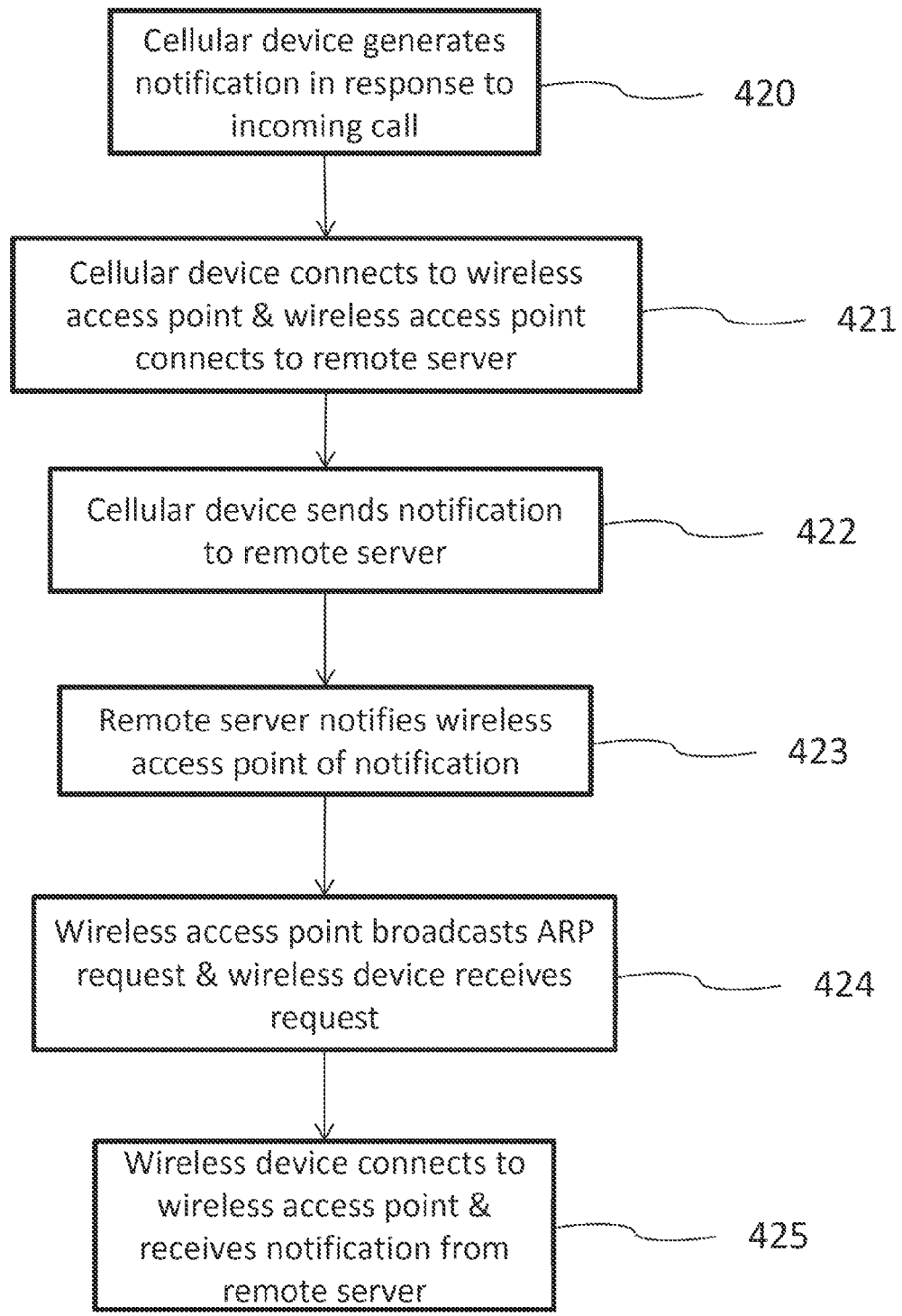
FIG. 4B illustrates a flow chart of an exemplary process flow for sending messages between a cellular device and wireless device according to examples of the disclosure.

FIG. 4A illustrates an exemplary cellular device connected with a wireless device over a WiFi network in a cloud computing environment, and FIG. 4B illustrates a flow chart of an exemplary process flow for sending messages between the cellular device and wireless device according to examples of the disclosure. Cellular device 410 can connect to wireless access point 404 through communications link 408, and can be connected to a cellular communication system 416. The user can receive an incoming call on the cellular device 410 from the cellular communication system 416. At 420, cellular device can push a notification of the incoming call to the wireless access point 404 through communications link 408. At 421, wireless device 402 can connect to wireless access point 404 through communications link 406, and wireless access point 404 can connect to remote server 412 via communications link 414. At 422, wireless access point 404 can push the notification to the remote server 412 through communications link 414. At 423, remote server can store the notification and push the notification to the wireless access point. In response to receiving the pushed notification, at 424, the wireless access point can broadcast an ARP request and establish a communications link 406 in manner similar to communications link 306 of FIG. 3A, as described above. The wireless access point can push the notification to a wireless device 402 through communications link 406. At 425, wireless device 402 can receive the notification of the incoming call. In some examples, the cellular device can push a notification after the cellular device has been ringing for a predetermined time limit and the call has been missed. In some examples, the cellular device can push a notification to indicate a newly received message such as voicemail, text message, or email. In some examples, the notification or message can be generated from the cellular device 410, such as a notification of the cellular device shutting down. While FIG. 4A illustrates a cellular device receiving a cellular signal from a cellular communication system, examples can include, but are not limited to, any wireless device, such as a headset or laptop, configured to connect to a wireless communication system. In some examples, one or more of the devices connected to the wireless access point can connect through wired communications.

In some examples, the user can generate a notification or message on wireless device 402 that can be, for example, in response to the incoming call. In some examples, the notification or message can be generated from a predefined list of messages, wherein the predefined list of messages can be stored in the wireless device 402, the cellular device 410, or both. Wireless device 402 can push the notification or message to wireless device 410 through the remote server 412 and wireless access point 404. Additionally, examples of the disclosure can include pushing data such as documents, files, and information.

Figure 5A:
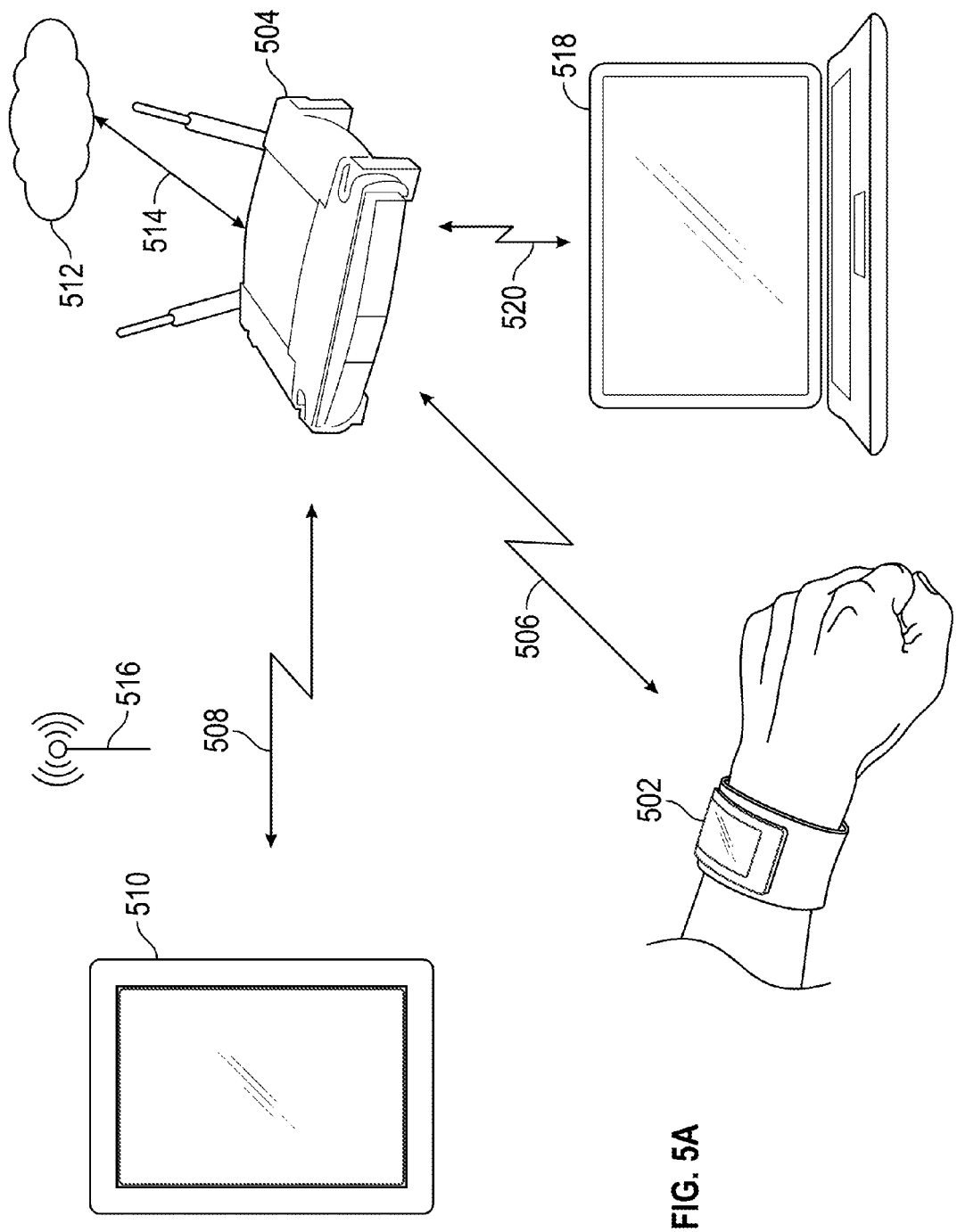
FIG. 5 illustrates an exemplary cellular device connected with multiple wireless devices over a WiFi network in a cloud computing environment according to examples of the disclosure.
Figure 5B:
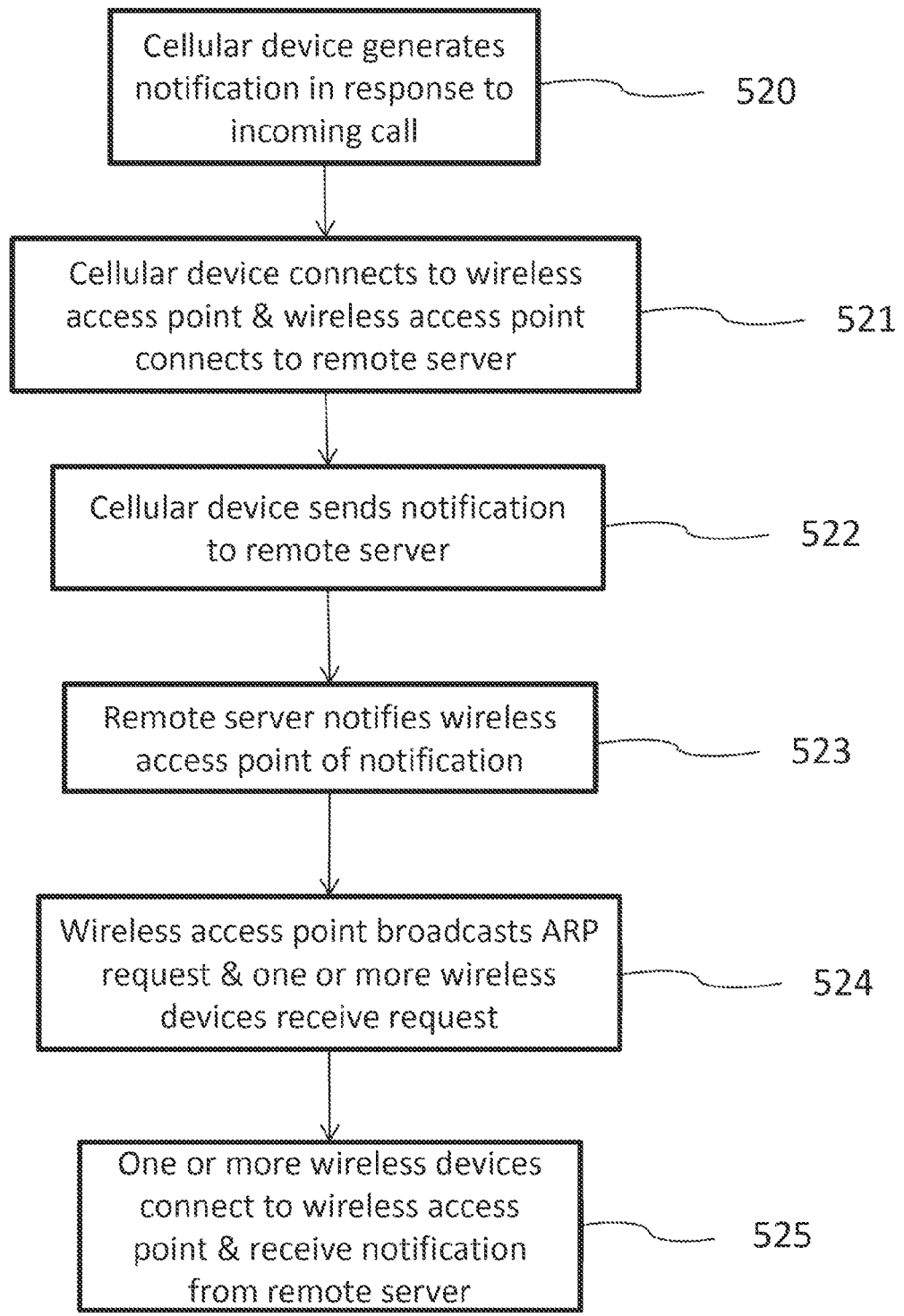

FIG. 5A illustrates an exemplary cellular device connected with multiple wireless devices over a WiFi network in a cloud computing environment, and FIG. 5B illustrates a flow chart of an exemplary process flow for sending messages between the multiple wireless devices according to examples of the disclosure. Wireless device 502 can be connected to wireless access point 504 through communications link 506. A wireless device, such as cellular device 510, can be connected to wireless access point 504 through communications link 508, and can also be connected to cellular communication system 516. Wireless device 518 can be connected to wireless access point 504 through communications link 520. Wireless access point 504 can be connected to remote server 512 through communications link 514. At 520, the user can receive an incoming call or message on the cellular device 510 from the cellular communication system 516. At 521, the cellular device can push a notification of the incoming call or message to the wireless access point. At 522, the wireless access point 504 can push the notification to the remote server 512 to be stored. Wireless access point 504 can broadcast the ARP request without a corresponding IP address. At 525, one or more of the wireless devices, such as wireless devices 502 and 518, can connect to the wireless access point to access the notification. While FIG. 5 illustrates three wireless devices, examples of the disclosure can include any number of wireless devices. In some examples, one or more of the devices connected to the wireless access point can connect through wired communications.

In some examples, one or more of the wireless devices can be connected through WiFi, while other wireless devices can be connected through Bluetooth. In some examples, one or more wireless devices can detect if the conditions are suitable for a Bluetooth connection and determine if a connection to Bluetooth is available. The wireless device can generate a notification to notify the user or another wireless device of the availability of a Bluetooth connection or can automatically reestablish the Bluetooth connection. In some examples, based on the determination if a connection to Bluetooth is available, the wireless device can terminate the connection with WiFi.

Figure 6:
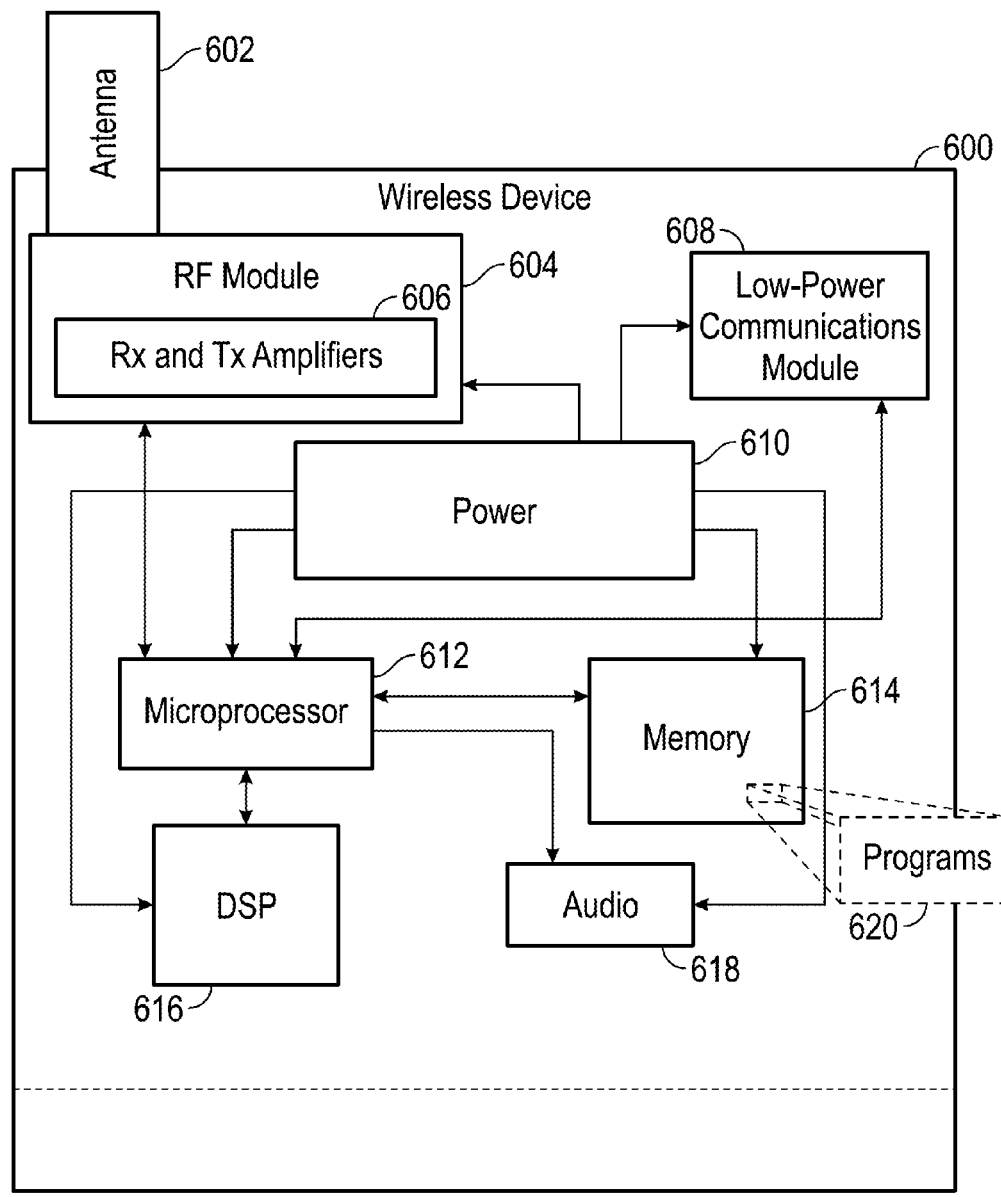
FIG. 6 illustrates an exemplary block diagram of a wireless device according to examples of the disclosure.

FIG. 6 illustrates an exemplary block diagram of a wireless device according to examples of the disclosure. Antenna 602 is designed to emit and receive electromagnetic waves according to a wireless or air interface standard such as IEEE 802.11 or 802.15. In some examples, antenna 602 can be adapted to communicate with a wireless access point, which can provide the wireless device 600 with access to a broader network (e.g., the Internet). In many examples, the RF module 604 can have a transceiver adapted to convert the electromagnetic waves to current and ultimately to digital data, and conversely the digital data to current and then to electromagnetic waves (as applicable). In some examples, the transceiver can enter a standby state when not being used or when a connection becomes unavailable. One or more receive or transmit amplifiers 606 may optionally be used to amplify signals for transmission, as is well known in the art. Wireless device 600 can include a low-power communications module 608 that can be configured to operate low power, near field communications with proximal devices. As an example, module 608 can be configured to communicate with other devices using Bluetooth.

The exemplary wireless device 600 can have a central processing unit (such as integrated circuit microprocessor 612 and/or a digital signal processor discussed below), which can be adapted to perform basic processing operations of the wireless device 600. Memory 614 can have one or more storage devices capable of storing signals as bits of data. Memory 614 may therefore have any combination of volatile memory or non-volatile memory, in accordance with the scope of the present application (for example, DRAM, SRAM, flash memory, EAROM, EPROM, EEPROM, and/or myriad types of other memory modules).

The wireless device 600 can optionally contain an audio controller 618 and one or more digital signal processors (DSPs) 616 for audio, signal, image, and/or video processing. A power source 610, such as a battery, can provide power to the various components of the wireless device 600.

In one example, the microprocessor 616 can be adapted to execute one or more software programs 620 stored in memory 614. The term "programs" can be understood to mean software modules that contain computer code to execute via a processor to operate the wireless device. The programs 620 can, upon detecting a specific control signal, modify the functionality of the wireless device 600 according to the type of signal detected, or alternatively, by the contents of the signal provided (e.g. commands embedded within a WiFi beacon, as described elsewhere herein).

Therefore according to the above disclosure, some examples of the disclosure are directed to A wireless device, the wireless device comprising: a first transceiver configured for communication with a first wireless access point, wherein the first wireless access point is configured for communication with a remote server; a second transceiver configured for communicating with a second wireless device; and a processor capable of determining whether communication with the second wireless device is unavailable, and when the communication with the second wireless device is unavailable, connecting the first transceiver to the first wireless access point. Additionally or alternatively to one or more examples disclosed above, in other examples the determination of whether communication with the second wireless device is unavailable includes determining a signal strength of the second transceiver, and determining whether the signal strength of the second transceiver falls below a predetermined level. Additionally or alternatively to one or more examples disclosed above, in other examples the processor is further capable of generating a notification based on the determination of whether the communication with the second wireless device is unavailable. Additionally or alternatively to one or more examples disclosed above, in other examples the wireless device, further comprises a third transceiver configured for communication with a second wireless access point. Additionally or alternatively to one or more examples disclosed above, in other examples the processor is further capable of receiving data from at least one of the first wireless access point via the first transceiver or the second wireless access point via the third transceiver. Additionally or alternatively to one or more examples disclosed above, in other examples the processor is further capable of sending the received data to the remote server through the first wireless access point via the first transceiver. Additionally or alternatively to one or more examples disclosed above, in other examples the second transceiver is further configured to enter a standby state based on the determination of whether communication with the second wireless device is unavailable. Additionally or alternatively to one or more examples disclosed above, in other examples the processor is further capable of determining of whether communication with the second wireless device is available when the second transceiver is in the standby state. Additionally or alternatively to one or more examples disclosed above, in other examples the second transceiver is further configured to exit the standby state and reestablish communication with the second wireless device based on the determination of whether communication with the second wireless device is available. Additionally or alternatively to one or more examples disclosed above, in other examples the first transceiver is further configured to terminate communication with the first wireless access point and enter a standby state based on the determination of whether communication with the second wireless device is available. Additionally or alternatively to one or more examples disclosed above, in other examples the processor is further capable of generating a notification based on the determination of whether communication with the second wireless device is available.

According to the above disclosure, some examples of the disclosure are directed to a method of configuring a wireless device to communicate with a first wireless access point and a second wireless device, the method comprising: determining whether communication with the second wireless device is unavailable; and connecting to the first wireless access point when communication with the second wireless device is unavailable, wherein the first wireless access point is configured to communicate with a remote server. Additionally or alternatively to one or more examples disclosed above, in other examples the determination of whether communication with the second wireless device is unavailable includes determining a signal strength of the communication with the second wireless device and determining whether the signal strength falls bellows a predetermined level. Additionally or alternatively to one or more examples disclosed above, in other examples the method further comprises generating a notification when the communication with the second wireless device becomes unavailable. Additionally or alternatively to one or more examples disclosed above, in other examples the wireless device is further configured to communicate with a second wireless access point. Additionally or alternatively to one or more examples disclosed above, in other examples the method further comprises receiving data from at least one of the first wireless access point or the second wireless access point. Additionally or alternatively to one or more examples disclosed above, in other examples the method further comprises sending the received data to the remote server through the first wireless access point. Additionally or alternatively to one or more examples disclosed above, in other examples the method further comprises determining whether communication with the second wireless device becomes available, terminating connection with the first wireless access point, and reestablishing the connection with the second wireless device. Additionally or alternatively to one or more examples disclosed above, in other examples the method further comprises generating a notification based on the determination of whether communication with the second wireless device is available.

According to the above disclosure, some examples of the disclosure are directed to a non-transitory computer readable storage medium having stored thereon a set of instructions for configuring a wireless device to communicate with a first wireless access point, a second wireless device, and a second wireless access point, that when executed by a processor causes the processor to: determine whether communication with the second wireless device is unavailable; connect the wireless device to the first wireless access point based on the determination of whether the communication with the second wireless device is unavailable, such that the wireless device and the first wireless access point are configured to communicate with one another; and receive data from a remote server through the first wireless access point. Additionally or alternatively to one or more examples disclosed above, in other examples the determination of whether communication with the second wireless device is unavailable includes determining a signal strength of the second transceiver and determining whether the signal strength of the second transceiver falls below a predetermined level. Additionally or alternatively to one or more examples disclosed above, in other examples the non-transitory computer readable storage medium further causes the processor to: generate a notification based on the determination of whether the communication with the second wireless device is unavailable. Additionally or alternatively to one or more examples disclosed above, in other examples the non-transitory computer readable storage medium further causes the processor to: connect the wireless device to the second wireless access point. Additionally or alternatively to one or more examples disclosed above, in other examples the non-transitory computer readable storage medium further causes the processor to: receive data from the second wireless access point. Additionally or alternatively to one or more examples disclosed above, in other examples the non-transitory computer readable storage medium further causes the processor to: send the received data to the remote server through the first wireless access point.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A wireless device comprising:
   a first transceiver configured to communicate with a wireless access point;
   a second transceiver configured to communicate with a second wireless device using a peer-to-peer connection; and
   a processor configured to:
      determine a status of a communications link with the second wireless device through the second transceiver,
      responsive to a determination that the status of the communications link with the second wireless device is unsuitable for communication, connect to the wireless access point via the first transceiver, and
      receive data generated by the second wireless device through the first transceiver, the data comprising a notification of a communication received at the second wireless device, the notification being separate from the communication.

2. The wireless device of claim 1, wherein the processor is configured to determine the status of the communications link by determining a received signal strength at the second transceiver, and determining whether the received signal strength at the second transceiver falls below a predetermined level.

3. The wireless device of claim 1, wherein the status of the communications link is determined to be unsuitable for communication when: the peer-to-peer connection is unavailable, a number of other devices using peer-to-peer connections with the wireless device is greater than a first threshold, the second wireless device is not available, a data transfer rate over the peer-to-peer connection is less than a second threshold, or a security level of the peer-to-peer connection is less than a third threshold.

4. The wireless device of claim 1, wherein the second transceiver is further configured to enter a standby state in response to the determination that the status of the communications link is unsuitable for communication.

5. The wireless device of claim 4, wherein the processor is further configured to determine that the status of the communications link with the second wireless device is suitable when the second transceiver is in the standby state.

6. The wireless device of claim 5, wherein the second transceiver is further configured to exit the standby state and reestablish connection with the second wireless device using the peer-to-peer connection.

7. The wireless device of claim 5, wherein the first transceiver is further configured to terminate communication with the wireless access point and enter a standby state.

8. The wireless device of claim 1, wherein the processor is further configured to receive data communicated by the second wireless device from the first transceiver when the first transceiver is connected to the wireless access point.

9. The wireless device of claim 1, wherein the communication received at the second wireless device comprises at least one of an incoming phone call, a voicemail, a text message, or an email.

10. The wireless device of claim 1, wherein determining the status of the communications link includes receiving an address resolution request including an IP address of the wireless device.

11. A method of a first wireless device communicating with a second wireless device, the method comprising:
    determining a communications link status between the first wireless device and the second wireless device over a peer-to-peer connection; and
    responsive to the communications link status being unsuitable,
       transmitting an address resolution request from the second wireless device to a wireless access point,
       receiving the address resolution request at the first wireless device,
       connecting the first wireless device to the wireless access point, and
       transmitting data, generated by the second wireless device, from the wireless access point to the first wireless device.

12. The method of claim 11, further comprising:
    responsive to the communications link status being suitable terminating the connection with the wireless access point, and reestablishing the peer-to-peer connection.

13. The method of claim 11, further comprising:
    generating a notification indicative of the communications link status being suitable.

14. The method of claim 11, further comprising:
    determining whether an IP address included in the address resolution request corresponds to an IP address of the first wireless device in response to the communications link status being unsuitable.

15. The method of claim 11, wherein determining the communications status link includes at least one of:
    determining whether the peer-to-peer connection is available,
    determining a number of other devices using peer-to-peer connections and determining whether the number of other devices is greater than a first threshold, receiving a notification indicative of the second wireless device being powered down, receiving a notification indicative of the peer-to-peer connection being unavailable, determining a data transfer rate over the peer-to-peer connection and determining whether the data transfer rate is less than a second threshold, and determining a security of the peer-to-peer connection and determining whether the security is less than a third threshold.

16. The method of claim 11, further comprising:

receiving communications on the second wireless device from a cellular connection; and generating a notification in response to the received communications, wherein the data includes the generated notification.

17. The method of claim 16, wherein the notification is generated after a time for acknowledged receipt of the received communications on the second wireless device exceeds a predetermined time limit.

18. The method of claim 16, wherein the address resolution request excludes an IP address of the first device, the method further comprising:

connecting a third wireless device to the wireless access point; and transmitting the data from the wireless access point to the third wireless device.

19. A method comprising:

receiving, at a server, data from a first wireless device, the data having been locally stored at the first wireless device;

responsive to receiving the data from the first wireless device, storing the data on the server and transmitting the data to a second wireless device, the second wireless device having been authorized to receive the data that is locally stored at the first wireless device;

receiving, at the server, a modification to the data from the first wireless device, the modification to the data being received responsive to the data having been accessed or edited at the first wireless device; and responsive to receiving the modification to the data from the first wireless device, updating the data on the server based at least in part on the modification to the data and transmitting the modification to the data to the second wireless device.

20. The method of claim 19, further comprising:

receiving, at the server, an other modification to the data from the second wireless device, the other modification being received responsive to the data having been accessed or edited at the second wireless device; and responsive to receiving the other modification to the data from the second wireless device, updating the data on the server based at least in part on the other modification, and transmitting the other modification to the first wireless device.

* * * * *